March 3, 1942. B. BROCCOLI 2,275,216
ENGINE REMOVER AND REPLACER
Filed July 23, 1941   2 Sheets-Sheet 1
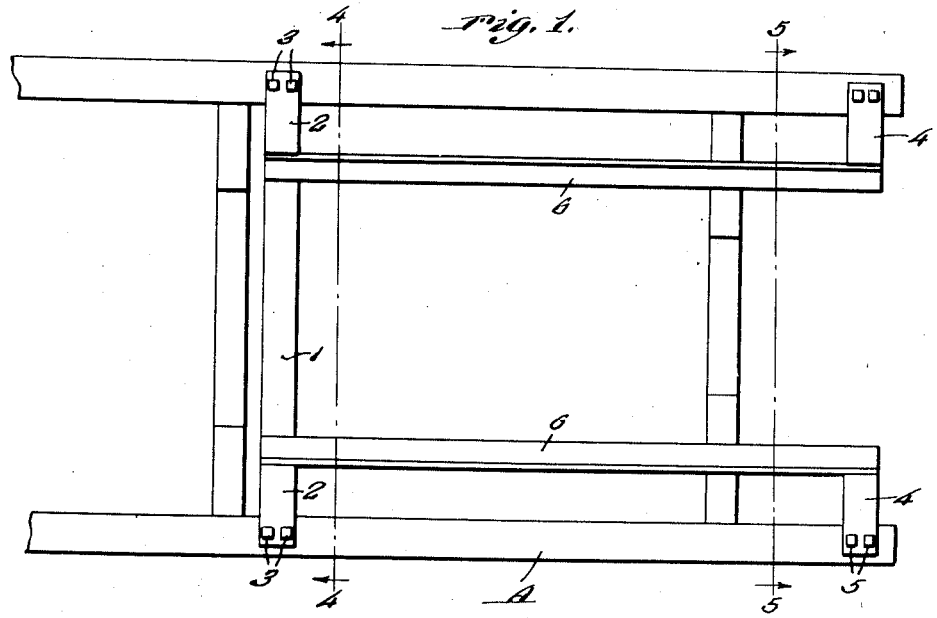
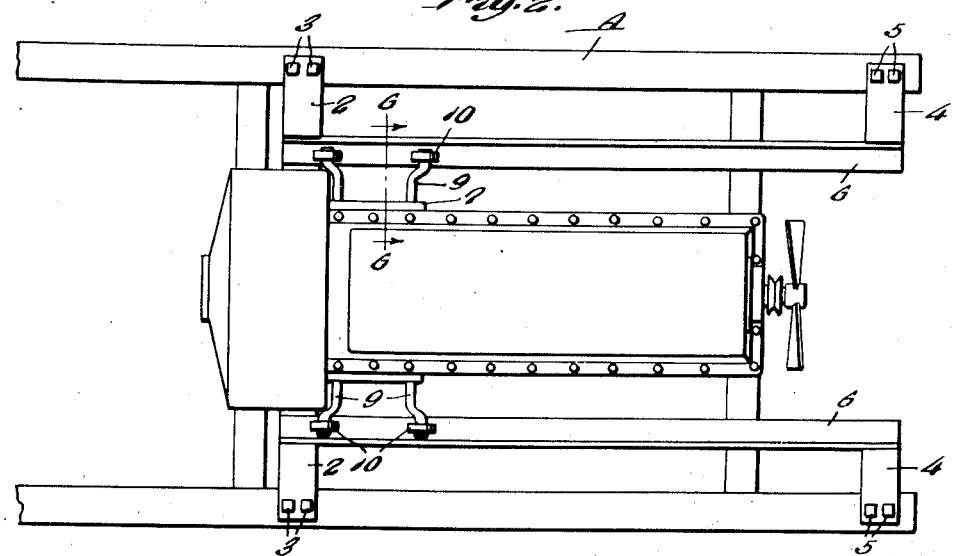
Inventor
Benny Broccoli
By Clarence A. O'Brien
Attorney March 3, 1942. B. BROCCOLI 2,275,216
ENGINE REMOVER AND REPLACER
Filed July 23, 1941 2 Sheets-Sheet 2
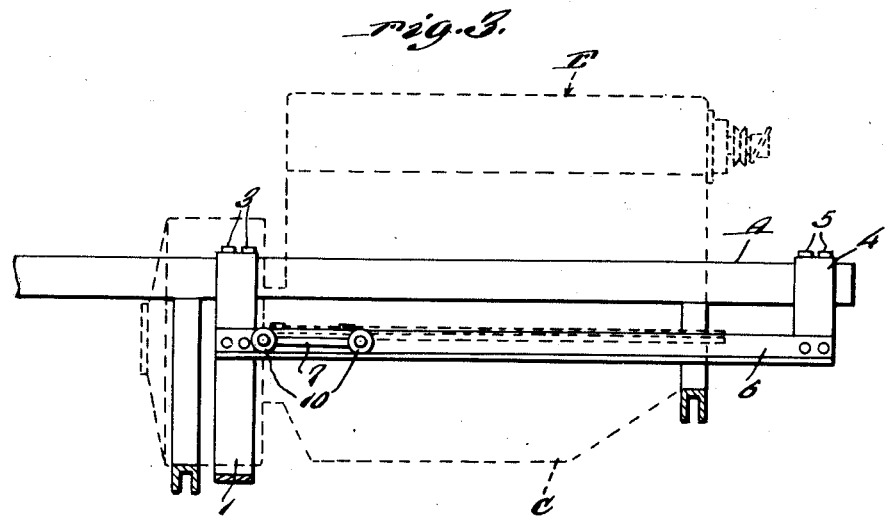
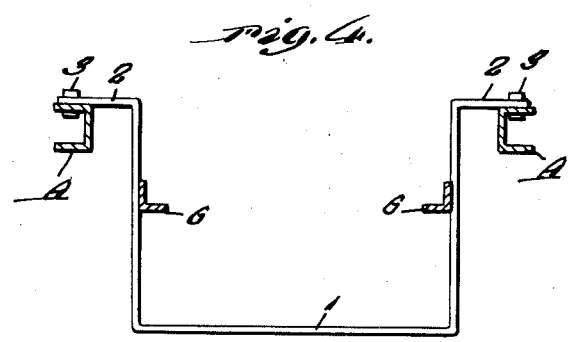
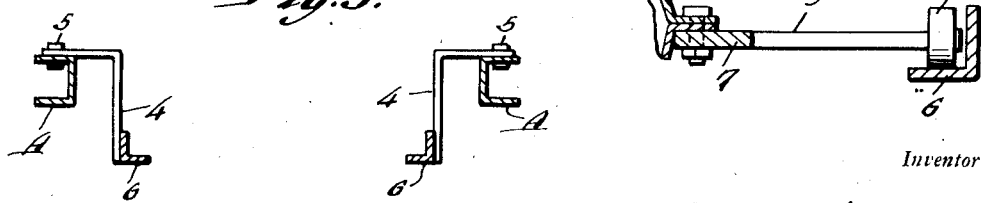
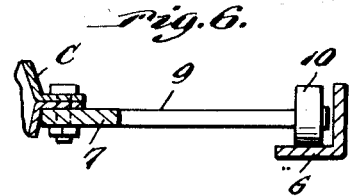
Inventor
Benny Broccoli
By Clarence A. O'Brien
Attorney Patented Mar. 3, 1942

2,275,216

UNITED STATES PATENT OFFICE 2,275,216

ENGINE REMOVER AND REPLACER

Benny Broccoli, Providence, R. I.

Application July 23, 1941, Serial No. 403,769

1 Claim. (Cl. 29—84)

This invention relates to a device for removing and replacing engines, the invention being especially designed for removing or replacing engines of trucks and the like where the cab is placed over the engine, the general object of the invention being to provide a frame which can be easily and quickly put in place on the vehicle frame at the front thereof and which supports a carriage which is adapted to be fastened to a part of the engine so that the engine can be moved from under the cab and to the front of the vehicle frame, after the radiator has been removed, so that the engine can be readily removed by block and tackle or the like and just as readily replaced after being repaired.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is a plan view showing the frame of the invention attached to the frame of the vehicle.

Figure 2 is a similar view but showing the parts attached to the engine ready to be moved forwardly.

Figure 3 is a side elevational view of Figure 1 showing the engine in dotted lines.

Figure 4 is a section on the line 4—4 of Figure 1.

Figure 5 is a section on the line 5—5 of Figure 1.

Figure 6 is a section on the line 6—6 of Figure 2.

In these views the numeral 1 indicates a U-shaped frame having the upper ends of its limbs bent outwardly as shown at 2 and these ends rest on the side members A of the vehicle frame, bolts 3 fastening the parts 2 to the side members A and the bolt holes of the parts 2 are lined up with the holes of the front running board brackets of the frame of the vehicle and the bolts pass through these holes as well as the holes in the parts 2. Where the brackets are fastened in place by rivets, the rivets are removed and replaced with bolts. Front inverted L-shaped brackets 4 have their horizontal parts bolted to the front portion of the vehicle by the bolts 5 and these bolts pass through the radiator brackets of the frame. The front ends of angle bars 6 are fastened to the inner faces of the lower ends of the brackets 4 and to intermediate parts of the limbs of the U-shaped frame, these parts 6 forming rails of a track. Elongated plate 7 are fastened to the rear part of the crankcase C of the engine E by removing some of the bolts which connect the crankcase to the lower part of the engine and then passing the bolts through holes in the plates 7 and through the holes in the crankcase so as to hold the plates in position. Each plate carries a pair of outwardly extending arms 9 which have rollers 10 rotatably connected with their outer ends and these rollers run on the tracks 6.

Thus the plates 7 with their arms 9 and rollers 10 form a carriage fastened to the rear part of the engine so that the engine can be moved longitudinally on the tracks formed by the members 6.

In using the invention the radiator is removed as is also the muffler and starting motor. Then the members 1 and 4 are fastened in place by fastening the member 1 to the front running board brackets and the members 4 and their bolts passing through the radiator bracket holes. Then the plates 7 are fastened to the motor after the rails 6 are fastened to the parts 1 and 4. The engine is raised sufficiently to install rollers on both sides of the engine with the rollers engaging the rails. Then the engine is moved forwardly far enough so that it can be engaged by a hoisting means. Of course, the motor is put back in place with the carriage in a forward position and then the motor or engine is moved backwardly and the parts removed and the motor fastened in place.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

In a device of the class described, a U-shaped bracket having outwardly extending end portions for bolting to a part of a vehicle frame, a pair of inverted L-shaped brackets having horizontal parts adapted to be bolted to the front part of a vehicle frame with their vertical parts extending downwardly, a pair of rails, means for connecting the front end of the rails to the lower ends of the vertical parts and the rear ends to the intermediate portions of the limbs of the U-shaped member, plates adapted to be connected with the crankcase by certain bolts of the crankcase and at the rear end thereof, arms extending outwardly from the plates and rollers on the arms engaging the rails.

BENNY BROCCOLI.